(12) United States Patent
Ganesan et al.

(10) Patent No.: US 11,379,771 B2
(45) Date of Patent: Jul. 5, 2022

(54) MANAGEMENT OF WORKFLOWS

(71) Applicant: PeerNova, Inc., San Jose, CA (US)

(72) Inventors: Gangesh Kumar Ganesan, Mountain View, CA (US); David John Hudson, Gwynedd (GB); Kevin Michael Gee, Redwood City, CA (US)

(73) Assignee: PeerNova, Inc., San Jose, CA (US)

( * ) Notice: Subject to any disclaimer, the term of this patent is extended or adjusted under 35 U.S.C. 154(b) by 317 days.

(21) Appl. No.: 15/453,674

(22) Filed: Mar. 8, 2017

(65) Prior Publication Data

US 2017/0262778 A1   Sep. 14, 2017

Related U.S. Application Data

(60) Provisional application No. 62/305,397, filed on Mar. 8, 2016.

(51) Int. Cl.
*G06Q 10/06* (2012.01)
*H04L 9/32* (2006.01)

(52) U.S. Cl.
CPC ......... *G06Q 10/0633* (2013.01); *G06Q 10/06* (2013.01); *H04L 9/3247* (2013.01); *G06Q 2220/00* (2013.01); *H04L 2209/38* (2013.01); *H04L 2209/56* (2013.01)

(58) Field of Classification Search
CPC ............ G06Q 10/0633; G06Q 2220/00; H04L 9/3247; H04L 2209/38; H04L 2209/56
See application file for complete search history.

(56) References Cited

U.S. PATENT DOCUMENTS

| | | | |
|---|---|---|---|
| 8,949,834 B2 | 2/2015 | Olston | |
| 9,230,130 B2 | 1/2016 | Peterson et al. | |
| 9,819,648 B1* | 11/2017 | Chilakapati | H04L 63/0428 |
| 2002/0152254 A1* | 10/2002 | Teng | G06F 21/41 |
| | | | 718/100 |
| 2010/0011410 A1* | 1/2010 | Liu | H04L 63/20 |
| | | | 726/1 |

(Continued)

OTHER PUBLICATIONS

PCT International Search Report and Written Opinion, PCT/US2017/021413, dated Jun. 20, 2017, 13 pages.

(Continued)

*Primary Examiner* — Jay Huang
*Assistant Examiner* — Courtney P Jones
(74) *Attorney, Agent, or Firm* — Fenwick & West LLP

(57) ABSTRACT

When a user of an interface system defines a workflow, the interface system transmits a notification to a user that is to perform the first step of the workflow. When the user requests to initiate the step of the workflow, the interface system creates a transaction for the workflow step. The user signs the transaction using a cryptographic key pair. The interface system receives the signed transaction and verifies the signature. Once the signature is verified, the step can be performed. The interface system forwards the transaction to a data storage system for storing. For performing the next step in the workflow, the data storage system identifies the user that is to perform the next workflow step. The data storage system creates a notification that identifies the user and the notification is provided to the user. The process repeats until each step of the workflow is performed.

22 Claims, 9 Drawing Sheets

(56) References Cited

U.S. PATENT DOCUMENTS

| | | | |
|---|---|---|---|
| 2011/0252427 A1* | 10/2011 | Olston | G06F 16/951 |
| | | | 718/102 |
| 2012/0260096 A1* | 10/2012 | Balinsky | G06F 21/6209 |
| | | | 713/176 |
| 2013/0191642 A1* | 7/2013 | Loughry | G06F 21/64 |
| | | | 713/176 |
| 2013/0263283 A1* | 10/2013 | Peterson | G06F 21/6218 |
| | | | 726/28 |
| 2013/0318354 A1* | 11/2013 | Entschew | H04L 9/3263 |
| | | | 713/175 |
| 2015/0143218 A1* | 5/2015 | Peterson | G06F 40/174 |
| | | | 715/223 |
| 2015/0312233 A1* | 10/2015 | Graham, III | H04L 9/006 |
| | | | 713/171 |
| 2016/0342812 A1* | 11/2016 | Lynch | G06F 21/6254 |
| 2016/0350091 A1* | 12/2016 | Khot | G06F 8/51 |
| 2017/0048216 A1* | 2/2017 | Chow | G06Q 40/08 |
| 2017/0220999 A1* | 8/2017 | Follis | G06Q 10/103 |
| 2018/0276270 A1* | 9/2018 | Bisbee | G06F 21/6218 |
| 2019/0050856 A1* | 2/2019 | Vintila | H04L 9/30 |
| 2020/0169415 A1* | 5/2020 | Schmidt | H04L 9/3247 |

OTHER PUBLICATIONS

Extended European Search Report, European Patent Application No. 17764021.6, dated Jun. 19, 2019, 8 pages.

* cited by examiner

MANAGEMENT OF WORKFLOWS

CROSS REFERENCE TO RELATED APPLICATION

This application claims the benefit of U.S. Provisional Patent Application No. 62/305,397, filed on Mar. 8, 2016, which is incorporated by reference herein in its entirety.

BACKGROUND

1. Field of Art

The present disclosure generally pertains to workflows, and in particular to cryptographically ensuring that a workflow occurs as intended.

2. Description of the Related Art

As part of doing business, confidential information typically has to be exchanged between multiple parties. Further, each party may perform a different step using the information as part of an overall workflow. For example, when a public company is going to release its financial results for a quarter, multiple parties must have access to that information before it becomes public. A typical workflow for releasing financial results may include, someone at the company generating a press release that includes the financial results, one or more other parties editing the generated press release, a release agent getting access to the finalized version of the press release, and the release agent simultaneously releasing the press release to different news and media outlets on an official press release date.

If an unauthorized party gets access to confidential information or if a workflow is not followed as designed, irreparable harm may be caused to the owner of the confidential information or an associated entity (e.g., business, shareholders, customers, employees, etc.). Continuing with the financial results example, if any unauthorized party gets access to financial results before the official press release date (e.g., by stealing user credentials) or if the workflow is not followed as intended (e.g., the press release is released early to the public) it could have catastrophic results for the company.

Data storage systems use a variety of different methods to keep stored information safe. However, with these data storage systems stored information is vulnerable when multiple parties associated with different entities have to access the data. Additionally, traditional data storage systems are not capable of ensuring that the proper workflow is followed in handling the information. The data storage systems may be able to control what type of rights users have to stored information (e.g., read and/or write access), but the data storage systems cannot ensure, for example, that a first user accesses stored information before a second user.

SUMMARY

In one embodiment, a user of an interface system defines a workflow. A workflow is a set of steps performed for purposes of achieving a certain goal. For example, a workflow may be for the release of a press release to news and media outlets, underwriting a loan, insurance underwriting, etc. The user defines the workflow using interfaces provided by the interface system. Through the interfaces the user may indicate the conditions that must be satisfied to perform each step of the workflow, which user is to engage in each step (e.g., user B is to edit the document), how long a user has to perform a step (e.g., user B has 24 hours to edit the document), and what happens if a user does not perform the step (e.g., skip to the next step in the workflow if user B does not edit the document within 24 hours).

Once the workflow has been defined, the interface system transmits a notification to a user that is to perform the first step of the workflow. In one embodiment, a user cannot initiate a workflow step unless the user first receives a notification indicating that the user is to perform the next workflow step. This ensures that workflow occurs as defined.

When the user requests to initiate the step of the workflow, the interface system creates a transaction for the workflow step that describes the step being performed. The transaction also includes the public key of the user that is to perform next workflow step according to the defined workflow. The user signs the transaction created by the interface system using a cryptographic key pair of the user. The interface system receives the signed transaction and verifies the digital signature of the transaction in order to confirm that the correct user is performing the step. Once the signature is verified, the step can be performed.

The interface system forwards the transaction to a data storage system for storing. As part of storing the transaction, the data storage system creates a transaction signature in order to cryptographically link the transaction with other transactions of the workflow. The data storage system creates the transaction signature based on the information of the transaction and the transaction signature of the preceding transaction/step in the workflow. Since the transaction signature of the preceding transaction is used to create the subsequent transaction signature, the transaction signatures are cryptographically linked. The linked transaction signatures act as records of workflow steps performed.

For performing the next step in the workflow, the data storage system identifies the user that is to perform the next workflow step from the public key included in the stored transaction. The data storage system creates a notification that identifies the user and the notification is provided to the user. The user can then initiate the next workflow step with the interface system based on the notification and the process repeats until each step of the workflow is performed.

In one embodiment, transaction signatures stored by the storage system are also transmitted to a computerized anchor system that stores transaction signature copies. The transaction signatures stored by the storage system are intended to be immutable. To verify that the transaction signatures stored by the storage system are not modified (e.g., by a malicious entity), a computerized audit process is periodically executed. The audit process includes comparing transaction signatures stored by the anchor system to the corresponding transaction signature stored by the data storage system. If the compared transaction signatures do not match, it indicates that the transaction records stored by the data storage system have been modified without authorization.

Hence, the interface system and the data storage system create a workflow environment where even if a user has access to the systems, the user cannot perform a workflow step unless it's time to perform the step and the workflow indicates that the user is to perform the step. Further, each step is cryptographically recorded and the records can be audited in a computerized manner to verify that there has been no tampering with the records.

The figures depict, and the detail description describes, various non-limiting embodiments for purposes of illustration only. One skilled in the art will readily recognize from the following discussion that alternative embodiments of the structures and methods illustrated herein may be employed without departing from the principles described herein.

DETAILED DESCRIPTION

Figure 1A:
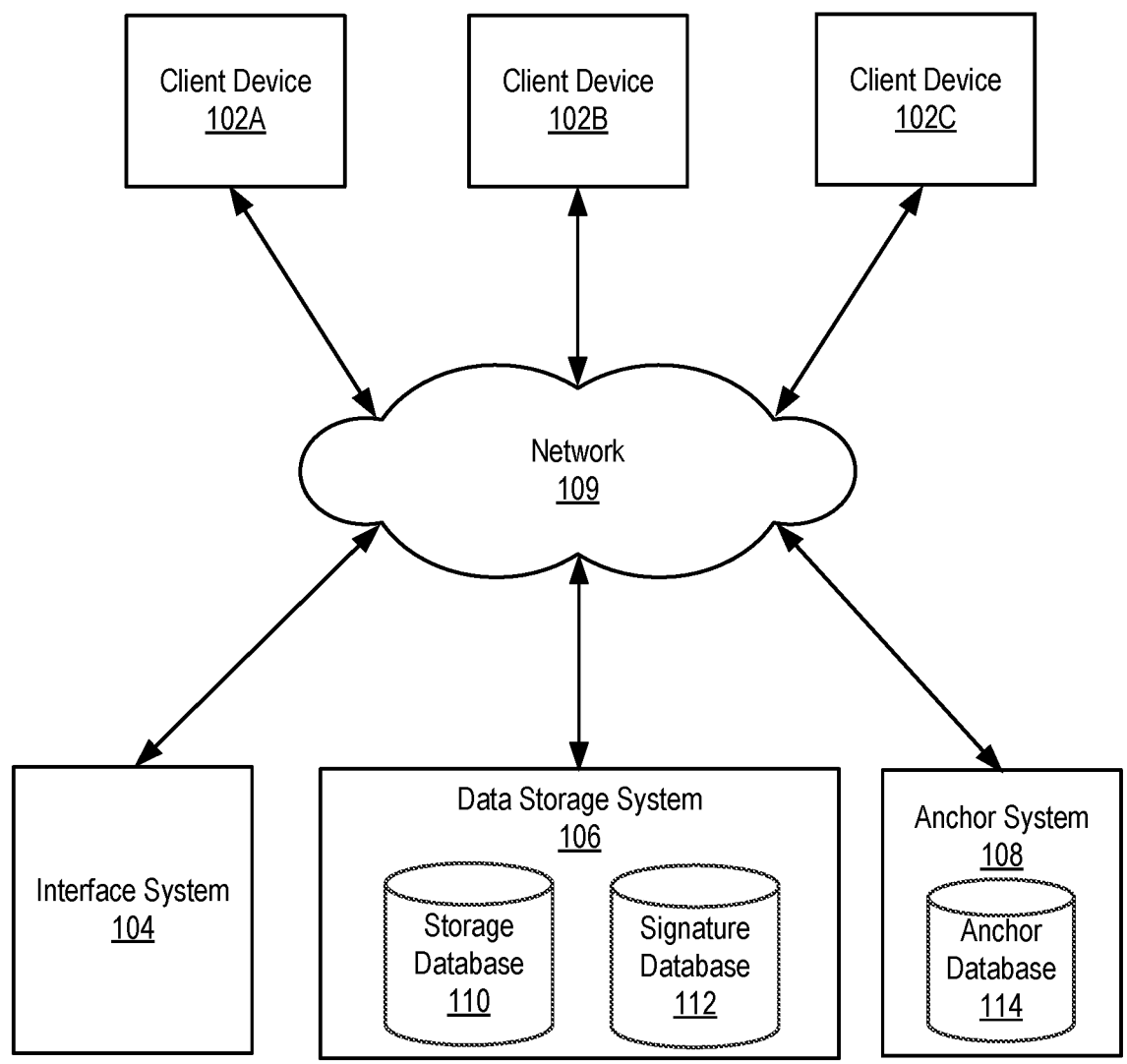
FIG. 1A is a block diagram of a workflow management environment in accordance with one embodiment.

FIG. 1A is a block diagram of a workflow management environment 100 in accordance with one embodiment. The workflow management environment 100 includes client devices 102A, 102B, and 102C, an interface system 104, a data storage system 106, and an anchor system 108 connected via a network 109. Although the illustrated environment 100 includes only a select number of each entity, other embodiments can include more or less of each entity (e.g., additional client devices 102).

FIG. 1A and the other figures use like reference numerals to identify like elements. A letter after a reference numeral, such as "102A," indicates that the text refers specifically to the element having that particular reference numeral. A reference numeral in the text without a following letter, such as "102," refers to any or all of the elements in the figures bearing that reference numeral.

A client device 102 is a device used by a user to communicate with the entities connected to the network 109. A client device 102 may be, for example, a personal computer, smart phone, tablet computer, or personal digital assistant (PDA). A client device 102 stores a cryptographic key pair of a user. The cryptographic key pair includes a public key and private key that are related to each other. In one embodiment, the client device 102 also stores authentication information associated with the user. The authentication information may be, for example, a user ID and password. The authentication information may be stored in a web browser cookie.

The interface system 104 is a computer system that manages workflows. A workflow is a set of steps performed for purposes of achieving a certain goal. When a user of a client device 102 requests to create a workflow, the interface system 104 provides the client device 102 with one or more interfaces that can be used by the user to define the workflow. Through the interfaces, the user indicates the different steps of the workflow.

After the workflow has been defined, the interface system 104 creates a transaction for each workflow step before it occurs. A transaction created for a workflow step includes information that describes the step being performed, the user performing the step, and any conditions for performing the step (e.g., document must be accessed within 24 hours). In one embodiment, if performing the step involves a data file (e.g., accessing a document), the transaction includes metadata associated with the file (e.g., storage location of a document). The transaction also includes the public key of the user that is to perform the next step in the workflow.

The interface system 104 transmits the transaction to the client device 102 of the user that is to perform the current step. The user signs the transaction using his public and private keys. The interface system 104 receives the signed transaction and verifies the digital signature of the transaction in order to make sure the correct user is performing the step. In one embodiment, the interface system 104 also verifies that the conditions of the step are met. The interface system 104 forwards the signed transaction to the data storage system 106 so that it can be logged and the step can be completed.

For performing the next step in the workflow, the interface system 104 transmits a notification to the client device 102 of the user that is to perform the next workflow step. The user that is to perform the next step is determined based on the signed transaction. As described above, the transaction includes the public key of the user that is to perform the next step. The notification sent to the user's client device 102 indicates that the user is to perform the next step. In one embodiment, a user cannot initiate a workflow step until the user receives a notification indicating that the user is to perform the next step.

In one embodiment, the interface system 104 provides the client device 102 with an interface that allows the user to initiate the next step. For example, if the next step is for the user to access a document stored by the data storage system 106, the interface system 104 can provide an interface through which the user can request to access the document. When the user requests to perform the next step, the interface system 104 repeats the process of creating a transaction for the step.

The data storage system 106 is a computer system that stores data related to workflows. The data storage system 106 includes a storage database 110 and a signature database 112. The storage database 110 stores data files that users have stored as part of workflows. The data files may be documents, videos, music, presentations, or any other type of computer files. The storage database 110 also stores workflow transactions received by the data storage system 106 from the interface system 104. In one embodiment, the storage database 110 is a key-value database. Data stored in the storage database 110 is associated with a key. The key is used to store and retrieve the data from the storage database 110.

The signature database 112 stores transaction signatures generated for workflow transactions. The transaction signatures generated for the transactions of a workflow are cryptographically linked with each other and form a chain of transaction signatures. The transactions signatures of the workflow act as records of the steps that have been performed for the workflow. As described further below with reference to the anchor system 108, the signature database 112 is periodically audited by the anchor system 108 to verify there has been no unauthorized tampering with the data stored by the data storage system 106. In one embodiment, the transactions signatures of a workflow are stored in the signature database 112 as a directed acyclic graph (DAG). The DAG includes multiple nodes (may also be referred to as vertices). Each node includes a transaction signature created for the workflow. The node most recently added to DAG is referred to as the root node and it is connected via an edge to the previous root node.

The data storage system 106 processes requests to store signed transactions. In one embodiment, when the data storage system 106 receives from the interface system 104 a signed transaction for a workflow, the data storage system 106 verifies the digital signature of the transaction. In one embodiment, the data storage system 106 verifies the signature by verifying that that the formatting of the signature is correct. The data storage system 106 creates a transaction signature for the transaction. As part of creating the transaction signature, the data storage system 106 hashes the transaction to obtain a hash value. The data storage system 106 hashes the transaction using a hashing function, such as an SHA-256 function. Additionally, the data storage system 106 identifies the root node in the DAG associated with the workflow of the transaction. The data storage system 106 hashes the hash value with the transaction signature included in the root node to obtain the transaction signature for the transaction.

The data storage system 106 adds a new node to the DAG and includes the created transaction signature in the added node. The newly added node is now the root node of the DAG and the node is connected to the previous root node via an edge. Since each node added to DAG is connected to the previous root node, the nodes of the DAG form a chain of transaction signatures. The chain of transaction signatures act as a chronological record of the steps of the workflow performed. Additionally, since each transaction signature is created based on the previously stored transaction signature, the transaction signatures of the DAG are cryptographically linked. Hence, the data storage system 106 adds new transactions signatures to the chain as new steps occur, but does not modify transactions signatures that are already part of the chain since they act as a chronological record of the steps that have been performed. The transaction signatures of the chain are intended to be immutable.

The data storage system 106 also stores the transaction in the storage database 110. In one embodiment, the data storage system 106 uses the transaction signature created for the transaction as a key for storing the transaction in the storage database 110. In another embodiment, the data storage system 106 breaks the transaction into multiple data elements, hashes each data element and uses the resulting hash values of each data element as the respective key to store each of the data elements in the storage database 110.

The data storage system 106 also creates a notification that identifies the user that is to perform the next step of the workflow. The data storage system 106 determines the user that is to perform the next step from the public key included in the stored transaction. The data storage system 106 transmits the notification to the interface system 104 so that it can be forwarded to the user.

Further, when a transaction signature is created for a workflow transaction and stored in the signature database 112, the data storage system 106 also determines whether to transmit the transaction signature to the anchor system 108. The anchor system 108 maintains its own copies of transaction signatures stored by the data storage system 106. The copies of the transaction signatures are used by the anchor system 108 to audit the data storage system 106 for determining whether data stored by the data storage system 106 has been altered without authorization.

The data storage system 106 determines whether to transmit the transaction signature to the anchor system 108 according to settings set, for example, by a system administrator. The settings indicate how often created transaction signatures should be sent to the anchor system 108. For example, the settings may indicate that every created transaction signature be sent to the anchor system 108 or that every other transaction signature added to a DAG be sent to the anchor system 108. If the data storage system 106 determines to transmit the transaction signature based on the settings, the data storage system 106 transmits the transaction signature to the anchor system 108. A transaction signature transmitted to the anchor system 108 is referred to as an export anchor.

The data storage system 106 also processes requests to store and retrieve data files associated with workflows. The requests are received as part of workflow transactions. When the data storage system 106 receives a request to store a data file, the data storage system 106 hashes the data file to obtain a hash value. The data storage system 106 stores the data file in the storage database 110 using the hash value as a key. When the data storage system 106 receives a request to retrieve a stored data file, the data storage system 106 identifies a key included in the request. The data storage system 106 retrieves the data file from the storage database 110 using the key.

The anchor system 108 maintains anchors used for auditing the data storage system 106. The anchor system 108 includes an anchor database 114 that stores export anchors (transaction signatures) received from the data storage system 106 and import anchors created by the anchor system 108. In one embodiment, the data storage system 106 has no access to the anchors stored by the anchor system 108. Since the anchors stored by the anchor system 108 are used to audit the data storage system 106, the anchor system 108 is maintained separate from the data storage system 106 (e.g., a different entity manages the anchor system 108). Event if data storage system 106 has a security breach, the data stored by the anchor system 108 will not be susceptible to being modified.

When the anchor system 108 receives an export anchor from the data storage system 106, the anchor system 108 stores the export anchor in the anchor database 114. In one embodiment, the anchor system 108 stores with the export anchor an identifier received from the data storage system 106. The identifier indicates the node in which the transaction signature corresponding to the export anchor is stored in the signature database 112.

In one embodiment, when the anchor system 108 receives an export anchor from the data storage system 106, the anchor system 108 also creates an import anchor using the export anchor. The anchor system 108 creates the import anchor by hashing the export anchor with information associated with the time at which the import anchor is created, such as the present time (e.g., current date and/or current clock time). Since the import hash is created using information associated with the time at which the import anchor is created, it makes it infeasible for the import anchor to be recreated in the future. Hence, the import hash provides proof that it was created on the current date and/or time.

In one embodiment, to create the import anchor the anchor system 108 requests a time stamp with the current date and/or time from a third party entity. The third party entity is a trusted time stamping authority. The anchor system 108 receives the time stamp signed by the time stamping authority and hashes the time stamp with the export anchor to create the import anchor. In another embodiment, the anchor system 108 has a copy of the export anchor stored in a Bitcoin blockchain. The anchor system 108 receives the block number of the block in which the copy was stored in the blockchain and hashes the block number with the export anchor to create the import anchor. In another embodiment, the anchor system 108 creates the import anchor by hashing the export anchor with information from a current publication. For example, the export anchor may be hashed with the text from the front page of a newspaper published on that day.

The anchor system 108 stores the import anchor in the anchor database 114. In one embodiment, the import anchor is associated with the export anchor in the anchor database 114. Additionally, the anchor system 108 transmits the import anchor to the data storage system 106. The data storage system 106 creates a new node in the DAG of the signature database 112 that includes the export anchor and stores the import anchor in the new node. The new node is now the root node of the DAG and is connected via an edge to the previous root node. In a chain of transaction signatures/DAG stored by the signature database 112 an import anchor provides proof of time and makes it infeasible for the chain of transaction signatures to be recreated at a later time, for example, by a malicious entity trying to modify the data stored by the data storage system 106. In one embodiment, the anchor system 108 stores with the import anchor in the anchor database 114 an identifier that indicates the node in which the import anchor was stored in the signature database 112.

In one embodiment, the anchor system 108 audits data storage system 106 to determine if transaction signatures stored by the signature database 112 have been modified. To audit the data storage system 106, the anchor system 108 is given access to the information stored by the data storage system 106. The anchor system 108 may audit the data storage system 106 periodically or upon request from a user. When the anchor system 108 determines to audit the data storage system 106, the anchor system 108 retrieves export and import anchors from the anchor database 114. In one embodiment, the anchor system 108 retrieves all of the anchors stored in the anchor database 114. In another embodiment, the anchor system 108 retrieves select anchors (a subset of the stored anchors). For example, the anchor system 108 may retrieve anchors of a specific workflow or a random sampling of anchors.

For each export anchor retrieved, the anchor system 108 determines the node in the signature database 112 that is supposed to store the corresponding transaction signature. In one embodiment, the node is determined using a node identifier stored in the anchor database 114 with the export anchor. The anchor system 108 compares the export anchor with the corresponding transaction signature in the node stored by the signature database 112. If the export anchor and the transaction signature do not match, the anchor system 108 determines that a chain of transaction signatures that includes the transaction signature has been tampered with and modified without authorization. For example, assume there was a security breach and an unauthorized entity modifies a workflow's chain of transaction signatures stored by the signature database 112 in order to make it appear as if different steps occurred as part of the workflow. Such a modification would be detected when the export anchors are compared to transaction signatures from the chain of transaction signatures.

In the embodiment where the data storage system 106 uses a transaction signature as key to store the corresponding transaction in the storage database 110, the anchor system 108 also uses export anchor as a key to retrieve a transaction stored in the storage database 110. The anchor system 108 hashes the retrieved transaction to obtain a hash value. Additionally, the anchor system 108 identifies transaction signature in the chain that immediately precedes the transaction signature that corresponds to the export anchor. The anchor system 108 hashes the hash value with the identified transaction signature to obtain a result. Since the export anchor was originally generated based on identified transaction signature and the hash of the transaction, the result should match the export anchor. However, if the result of the hashing does not match the export anchor, the anchor system 108 determines that data stored by the data storage system 106 has been modified without authorization. The transaction stored in the storage database 110 or the identified transaction signature may have been modified.

Additionally, for each import anchor retrieved by the anchor system 108 from the anchor database 114, the anchor system 108 identifies the node that is supposed to store the corresponding import anchor. The anchor system 108 compares the retrieved import anchor with the import anchor in the identified node stored by the signature database 112. If the import anchors do not match, it signifies that data stored by the signature database 112 has been modified without authorization. In one embodiment, the lack of matching between the import anchors indicates the timing of the tampering with the signature database 112. The lack of matching may indicate that the tampering occurred after the creation of the import anchor.

In one embodiment, when the anchor system 108 determines that data stored by the data storage system 106 has been modified without authorization, the anchor system 108 notifies one or more system administrators. If timing information of the tampering was determined based on the anchors, the anchor system 108 also provides the timing information to the system administrator.

The network 109 represents the communication pathways between the client devices 102, the interface system 104, the data storage system 106, and the anchor system 108. In one embodiment, the network 109 is the Internet and uses standard communications technologies and/or protocols. The network 109 can also utilize dedicated, custom, or private communications links that are not necessarily part of the Internet. The network 109 may comprise any combination of local area and/or wide area networks, using both wired and wireless communication systems. In one embodiment, information exchanged via the network 109 is cryptographically encrypted and decrypted using cryptographic keys of the senders and the intended recipients.

Figure 1B:
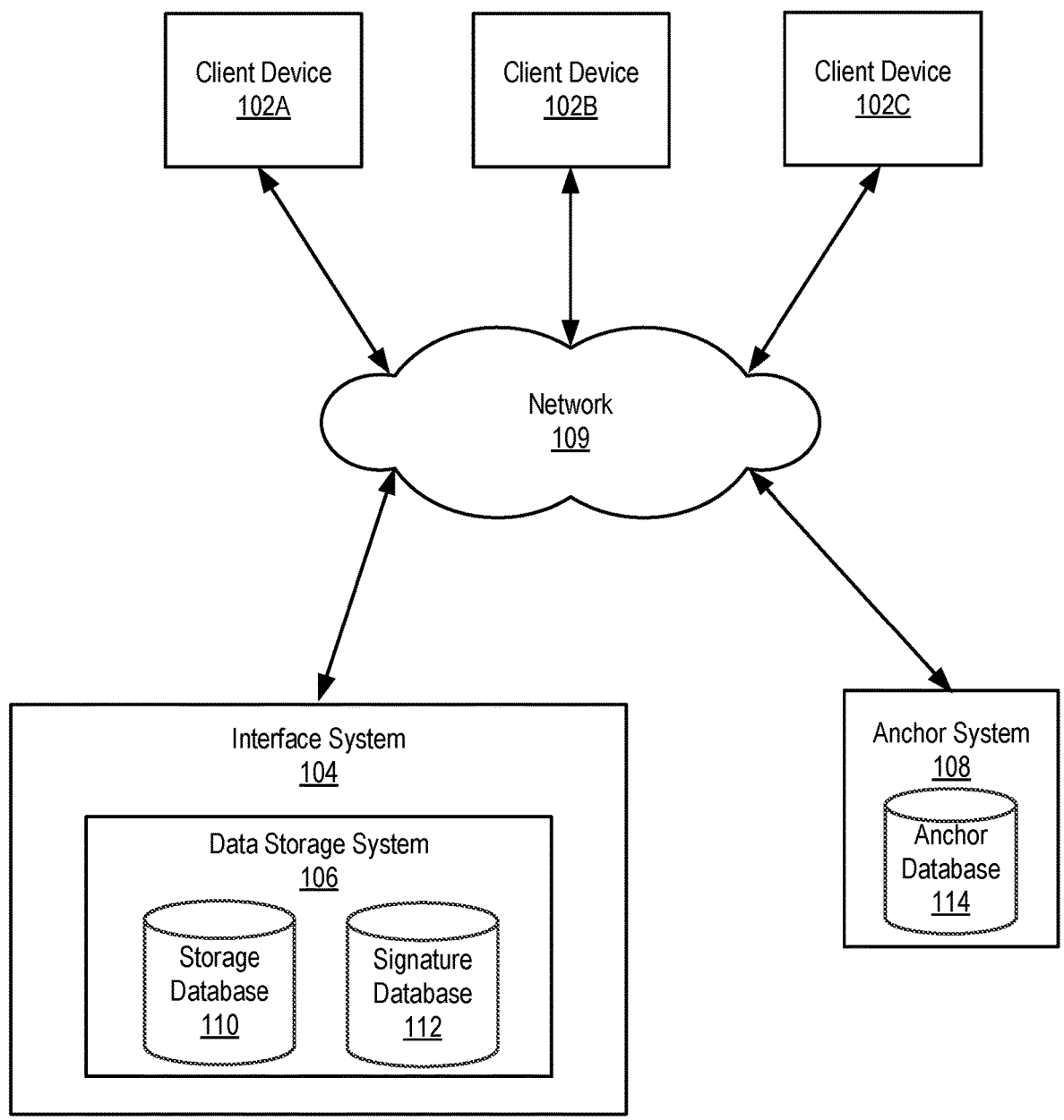
FIG. 1B is a block diagram of a workflow management environment in accordance with another embodiment.

Although the data storage system 106 is illustrated in FIG. 1A as being separate from the interface system 104, in other embodiments the data storage system 106 is part of the interface system 104. FIG. 1B illustrates the data storage system 106 being part of the interface system 104. The interface system 104 and the data storage system 106 may be managed by the same entity.

Figure 2:
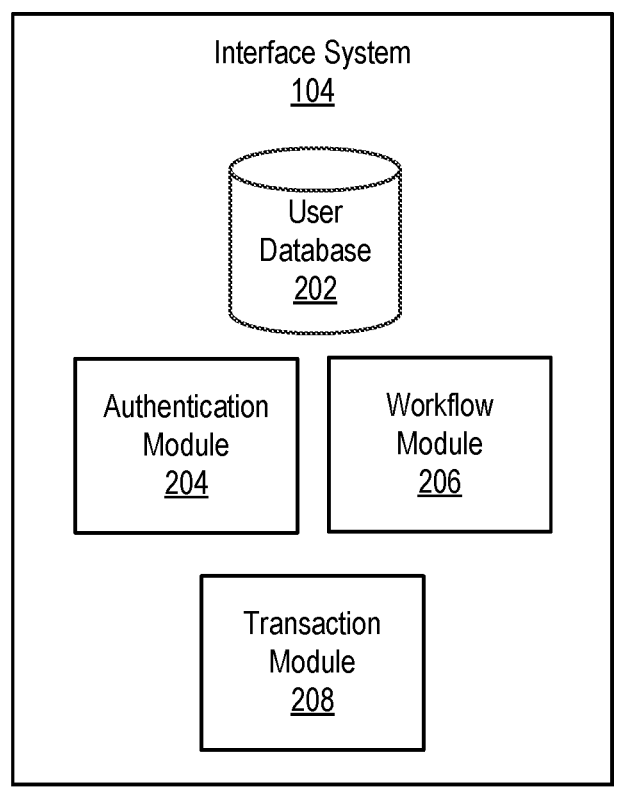
FIG. 2 is a block diagram of an interface system in accordance with one embodiment.

FIG. 2 is a block diagram illustrating components of the interface system 104 in accordance with one embodiment. The interface system 104 includes a user database 202, an authentication module 204, a workflow module 206, and a transaction module 208. Those of skill in the art will recognize that other embodiments of the interface system 104 can have different and/or other components than the ones described here, and that functionalities can be distributed among components in a different manner.

The user database 202 stores information associated with users of the interface system 104. The information stored for a user includes a public key of the user and communication information that can be used to communicate with the user. The communication information may be, for example, an IP address of the user's client device 102 or an email address of the user. Additionally, the user database 202 stores authentication information used to authenticate the user. The user's authentication information may include a user ID and password, a certificate, a token, or any other type of authentication credentials.

The authentication module 204 authenticates users of the interface system 104. When a user communicates with the interface system 104, the authentication module 204 determines whether a login session has been initiated for the user. A login is initiated when a user provides his corresponding authentication information and the authentication information is verified. If the authentication module 204 determines that a login session has not been initiated for the user, the authentication module 204 provides an interface to the user's client device 102. Through the interface the user provides his authentication information. The authentication module 204 receives through the interface the authentication information provided by the user and verifies the authentication information based on the information stored in the user database 202. For example, if the authentication information comprises a user ID and password, the authentication module 204 verifies based on the information stored in the user database 202 that the correct password was provided for the user ID.

The workflow module 206 allows a user to define workflows. When a user requests to create a workflow, the workflow module 206 provides the user's client device 102 with interfaces that can be used by the user to define the workflow. In one embodiment, through the interfaces the user indicates the different steps of the workflow, which user is to perform each step, how long a user has to perform a step, and what happens if the user does not perform the step, etc.

In one embodiment, the workflow module 206 stores templates that help guide a user in defining a workflow and expedite the process. The templates stored by the workflow module 206 are different for different types of workflows. For example, the workflow module 206 may store templates for workflows related to releasing a press release and templates related to underwriting a loan. When a user selects a template, the workflow module 206 provides the selected template to the user's client device 102. The template includes some of the information necessary for defining a workflow and the user can add to the template and edit the template through interfaces provided by the workflow module 206 to the client device 102. For example, the template may include each step of the workflow and the user may indicate which user is to perform each step and timelines associated with each step.

The workflow module 206 receives the information provided by the user through the interfaces and creates the workflow based on the received information. The workflow module 206 provides the workflow to the transaction module 208 so that transactions can be created for the workflow.

The transaction module 208 allows users to perform workflow steps. The transactions module 204 receives requests to initiate workflow steps. In one embodiment, a user can only requests to initiate a step of a workflow, if the user was the last user associated with the workflow to receive a notification indicating that the user is to perform the next step in the workflow. This ensures that the steps of the workflow are performed in the intended order.

In one embodiment, if a user was the last user to receive a notification, the transaction module 208 provides the user's client device 102 with an interface through which the user can initiate the workflow step. For example, if the step is for the user to access a document stored by the data storage system 106, interface system 104 provides an interface through which the user can request to access the document.

When a user requests to initiate a step of a workflow, the transaction module 208 creates a transaction for the workflow step. The transaction is a record that describes the workflow step and includes information associated with the step. For example, the transaction may include information describing the step being performed, the user performing the step, and conditions that must be satisfied to perform the step (e.g., user must provide a password to access the document). If the step involves a data file, the transaction module 208 includes metadata associated with the file in the transaction. The metadata may include, for example, information used to identify the file in a database (e.g., a key to identify the file in the storage database 110), the name of the file, and the size of the file. Additionally, the transaction module 208 also includes in the transaction the public key of the user that is to perform the next step in the workflow. The transaction module 208 may determine the public key of the user based on the workflow received from the workflow module 206 and/or information stored in the user database 202. The transaction may also include information describing subsequent steps of the workflow.

The transaction module 208 transmits the created transaction to the client device 102 of the user that requested to initiate the workflow step. The user is asked to digitally sign the transaction in order to verify that the intended user is performing the workflow step and that the transaction is not tampered with. The user digitally signs the transaction using his private and public key pair.

When the transaction module 208 receives the transaction signed by the user, the transaction module 208 verifies that the digital signature is valid. In one embodiment, to determine whether the digital signature is valid, the transaction module 208 retrieves from the user database 202 the public key of the user that is to perform workflow step. The transaction module 208 decrypts the digital signature using the public key and compares the result with a hash of the transaction. If the result of the decryption does not match the hash of the transaction or if the transaction module 208 is unable to decrypt the digital signature, the transaction module 208 determines that digital signature is not valid and denies the request to perform the workflow step. However, if the result of the decryption matches the hash of the transaction, the transaction module 208 determines that the digital signature is valid and forwards the transaction to the data storage system 106 so that the transaction can be stored and the step can be performed. In one embodiment, prior to forwarding the transaction to the data storage system 106, the transaction module 208 verifies that the conditions of the workflow step included in the transaction have been satisfied. If the conditions are not satisfied, the transaction module 208 notifies the user that conditions have not been satisfied and as a result the step cannot be performed.

When the transaction is performed, the transaction module 208 receives a notification from the data storage system 106 that identifies the user that is to perform the next step in the workflow. The transaction module 208 retrieves from the user database 202 communication information associated with the user that is to perform the next step. The transaction module 208 forwards the notification to the intended user using the retrieved communication information. As described above, the notification allows the user to initiate the next step with the transaction module 208.

FIGS. 3A-3D illustrate an interaction diagram of a workflow for releasing a document to one or more release services in accordance with one embodiment. The document may be, for example, a press release and the one or more release services have access to news and media outlets. The interaction diagram illustrates steps performed by a defining device 102A, an editor device 102B, a release device 102C, the interface system 104, and the data storage system 106. Those of skill in the art will recognize that other embodiments can perform the steps described for FIGS. 3A-3D in different order. Moreover, other embodiments can include different and/or additional steps than the ones described.

In this example, assume that the defining device 102A is operated by a defining user that defines the workflow and creates the initial version of the document. For example, the defining user may be an employee of a company that is releasing the document as a press release of the company. The editor device 102B is operated by an editing user that edits the document before it is released and the release device 102C is operated by a releasing user that releases the final version of the document to the release services. Additionally, assume for purposes of this example that editing user and the releasing user have been authenticated by the interface system 104 but the defining user has not been authenticated.

Figure 3A:
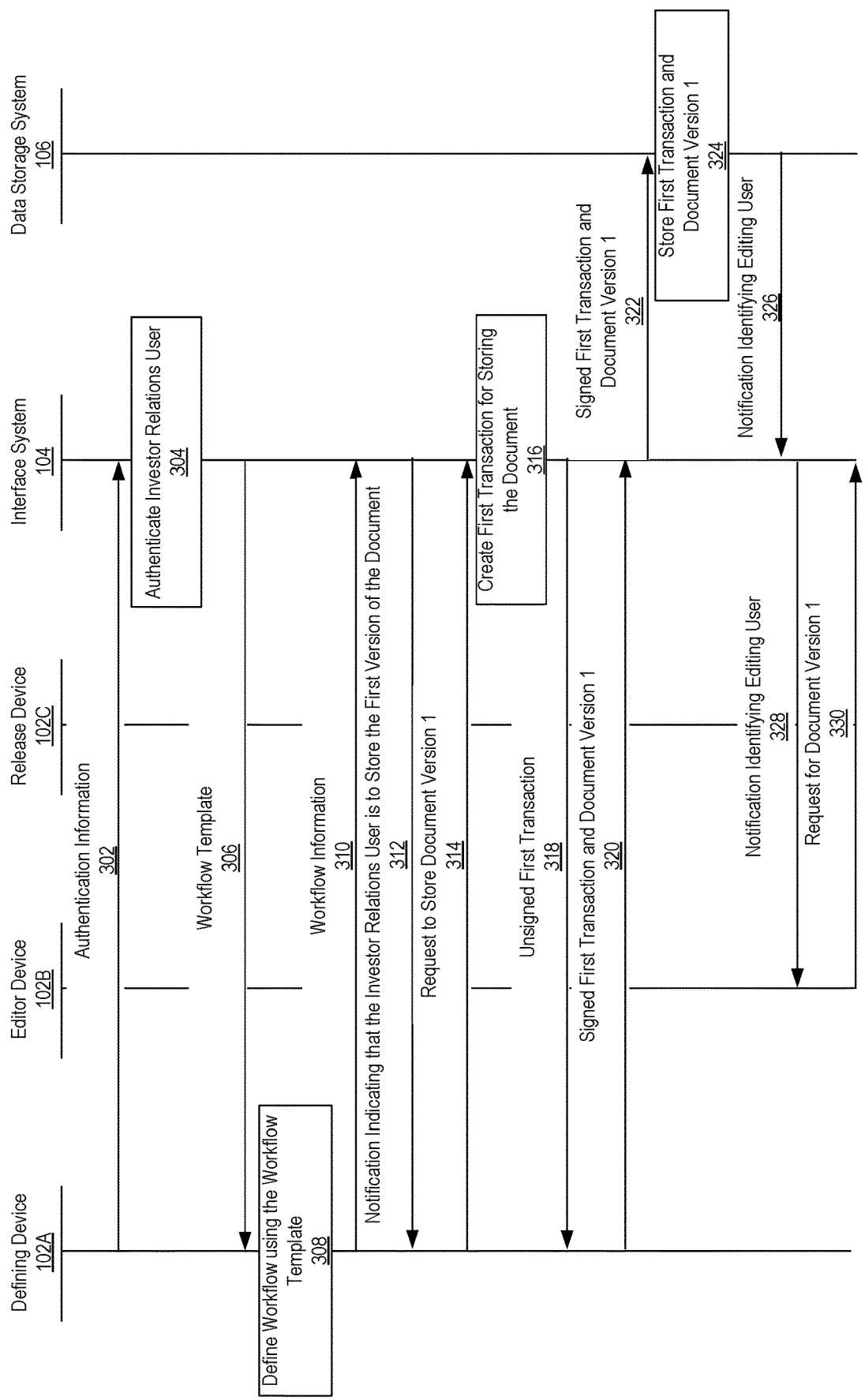
FIGS. 3A-3D illustrate an interaction diagram of a workflow for releasing a document to one or more release services in accordance with one embodiment.

Now, referring to FIG. 3A, the defining device 102A transmits 302 to the interface system 104 authentication information of the defining user. The interface system104 authenticates 304 the defining user based on the authentication information. The interface system 104 transmits 306 to the defining device 102A a workflow template. The defining user defines 308 the workflow using the workflow template. The investor relations device 102 transmits 310 to the interface system 104 workflow information that describes the workflow for releasing the document. Based on the workflow information, the interface system 104 transmits 312 to the defining device 102A a notification for the first step of the workflow. The notification indicates that the defining user is to store the first version of the document in the data storage system 106.

The defining device 102A transmits 314 to the interface system 104 a request to store the first version of the document in the data storage system 106. In one embodiment the interface system 104 provides an interface through which the user can request to the store the first version of the document. The interface system 104 creates 316 a first transaction for storing the first version of the document. The interface system 104 includes in the first transaction the public key of the editing user as an indication that editing user is to perform the next step in the workflow. The interface system 104 transmits 318 to the defining device 102A the unsigned first transaction. The defining device 102A transmits 320 to the interface system 104 the first transaction signed using the private and public key pair of the defining user. Along with the signed first transaction, the defining device 102A transmits the first version of the document. The interface system 104 forwards 322 to the data storage system 106 the signed first transaction and the first version of the document after verifying the digital signature of the transaction.

The data storage system 106 stores 324 the first transaction and the first version of the document in the storage database 110. As part of storing the first transaction, the data storage system 106 creates a transaction signature for the first transaction and stores the transaction signature in the signature database 112. In one embodiment, the transaction signature is the first signature in a transaction signature chain for the workflow. The data storage system 106 transmits 326 to the interface system 104 a notification indicating that the editing user is to perform the next step in the workflow. The data storage system 106 creates the notification based on the public key of the editing user included in the first transaction. The interface system 104 forwards 328 the notification to the editor device 102B. The interface system 104 may include additional information in the notification regarding the step that is to be performed by the editing user.

Figure 3B:
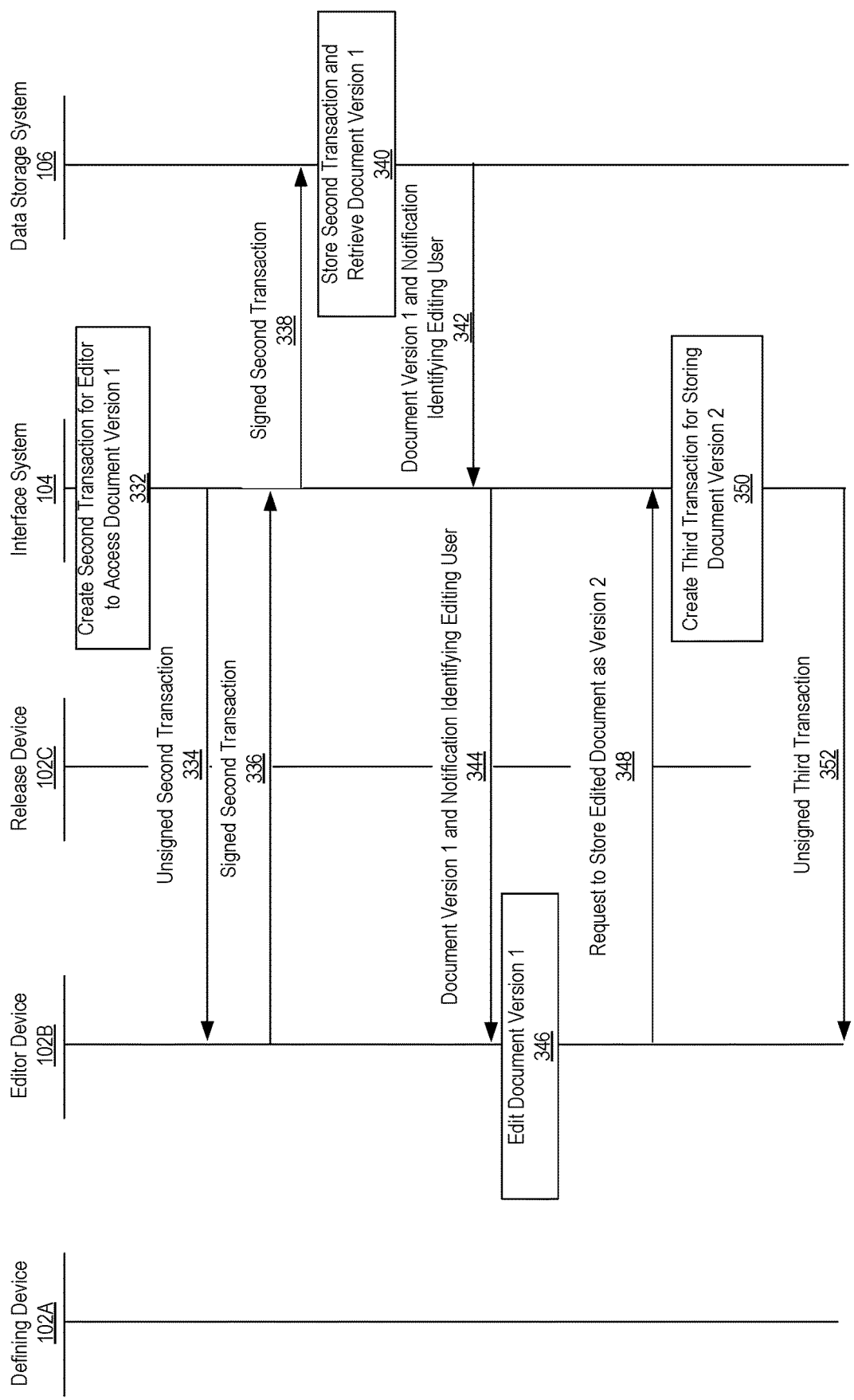

Based on the notification, the editing user determines that he is to access the first version of the document. The editor device 102B transmits 330 to the interface system 104 a request to access the first version of the document stored by the data storage system 106. Referring to FIG. 3B, the interface system 104 creates 332 a second transaction for accessing the first version of the document. The second transaction includes the public key of the editing user as an indication that editing user will also be performing the next step in the workflow. The interface system 104 transmits 334 to the editor device 102B the unsigned second transaction. The editor device 102B transmits 336 to the interface system 104 the second transaction signed using the private and public key pair of the editing user. The interface system 104 forwards 338 to the data storage system 106 the signed second transaction after verifying the digital signature of the transaction.

The data storage system 106 stores 340 the second transaction in the storage databases 110 and retrieves the first version of the document from the storage database 110. As part of storing the second transaction, the data storage system 106 also creates a transaction signature for the second transaction and adds the transaction signature to the workflow's chain of transaction signatures in the signature database 112. The data storage system 106 transmits 342 to the interface system 104 the first version of the document and a notification indicating that the editing user is to perform the next step in the workflow. The interface system 104 forwards 344 the first version of the document and the notification to the editor device 102B.

Based on the notification, the editing user determines that he is to edit the first version of the document and store the edited document as a second version. The editing user edits 346 the first version of the document. After completing edits to the document, the editor device 102 transmits 348 to the interface system 104 a request to store the edited document in the date storage system 106 as the second version.

Figure 3C:
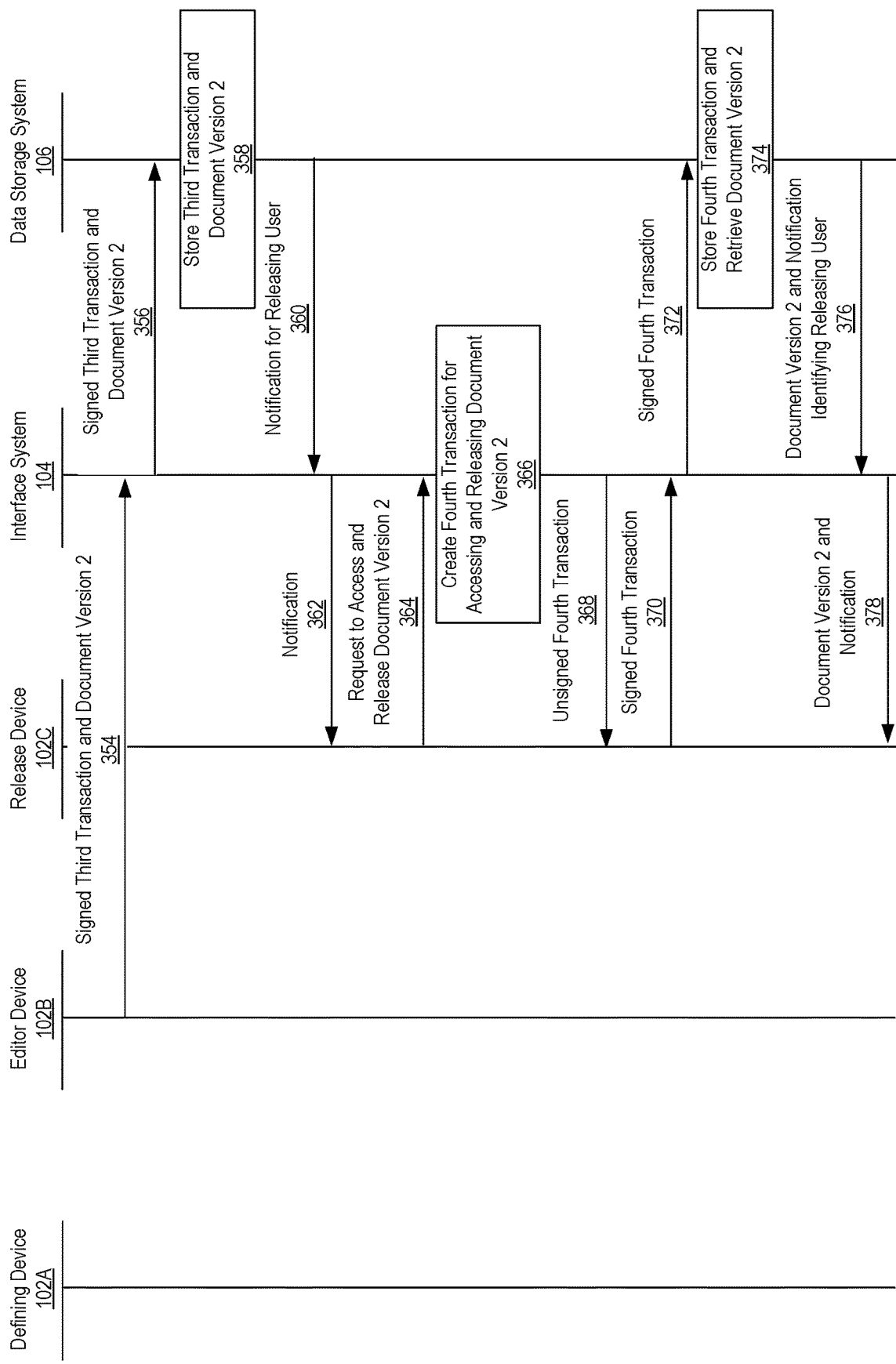

Based on the request, the interface system 104 creates 350 a third transaction for storing the second version of the document. The third transaction includes the public key of the releasing user as an indication that releasing user will be performing the next step in the workflow. The interface system 104 transmits 352 to the editor device 102 the unsigned third transaction. Referring to FIG. 3C, the editor device 102B returns 354 to the interface system 104 the third transaction signed by the editor device 102B and the second version of the document. The interface system 104 forwards 356 to the data storage system 106 the digitally signed third transaction along with the second version of the document.

The data storage system 106 stores 358 the third transaction and the second version of the document in the storage database 110. A transaction signature created for the third transaction is stored in the signature database 112 as part of workflow's chain of transaction signatures. The data storage system 106 transmits 360 to the interface system 104 a notification indicating that the releasing user is to perform the next step in the workflow. The interface system 104 forwards 362 the notification to the release device 102C.

Based on the notification, the releasing user determines that he is to access the second version of the document and release the document to one or more release services. In one embodiment, this step of the workflow may have a condition that the releasing user cannot request to access and release the document until a specific data and time. For example, if the document is a press release with a company's quarterly earnings, the interface system 104 may not be allow the releasing user to access the document until 4 PM eastern on a specific date as indicated by the workflow.

The release device 102C transmits 364 to the interface system 104 a request to access and release the second version of the document. The interface system 104 creates 366 a fourth transaction for accessing and releasing the second version of the document. The fourth transaction includes the public key of the releasing user to indicate that the releasing user will perform the next step. The interface system 104 transmits 368 to the release device 102C the unsigned fourth transaction and the release device 102C returns 370 to the interface system 104 the fourth transaction digitally signed by the release device 102C. The interface system 104 forwards 372 to the data storage system 106 the signed fourth transaction. In one embodiment, prior forwarding the signed fourth transaction to the data storage system 106, the interface system 104 verifies that each condition of the transaction has been satisfied (e.g., is it after 4 PM eastern on the specified date).

The data storage system 106 stores 374 the fourth transaction in the storage databases 110 and stores a transaction signature created for the fourth transaction in the signature database 112 as part of workflow's chain of transaction signatures. The data storage system 106 also retrieves the second version of the document from the storage database 110. The data storage system 106 transmits 376 to the interface system 104 the second version of the document and a notification indicating that the releasing user is to perform the next step in the workflow. The interface system 104 forwards 378 the second version of the document and the notification to the release device 102C.

Figure 3D:
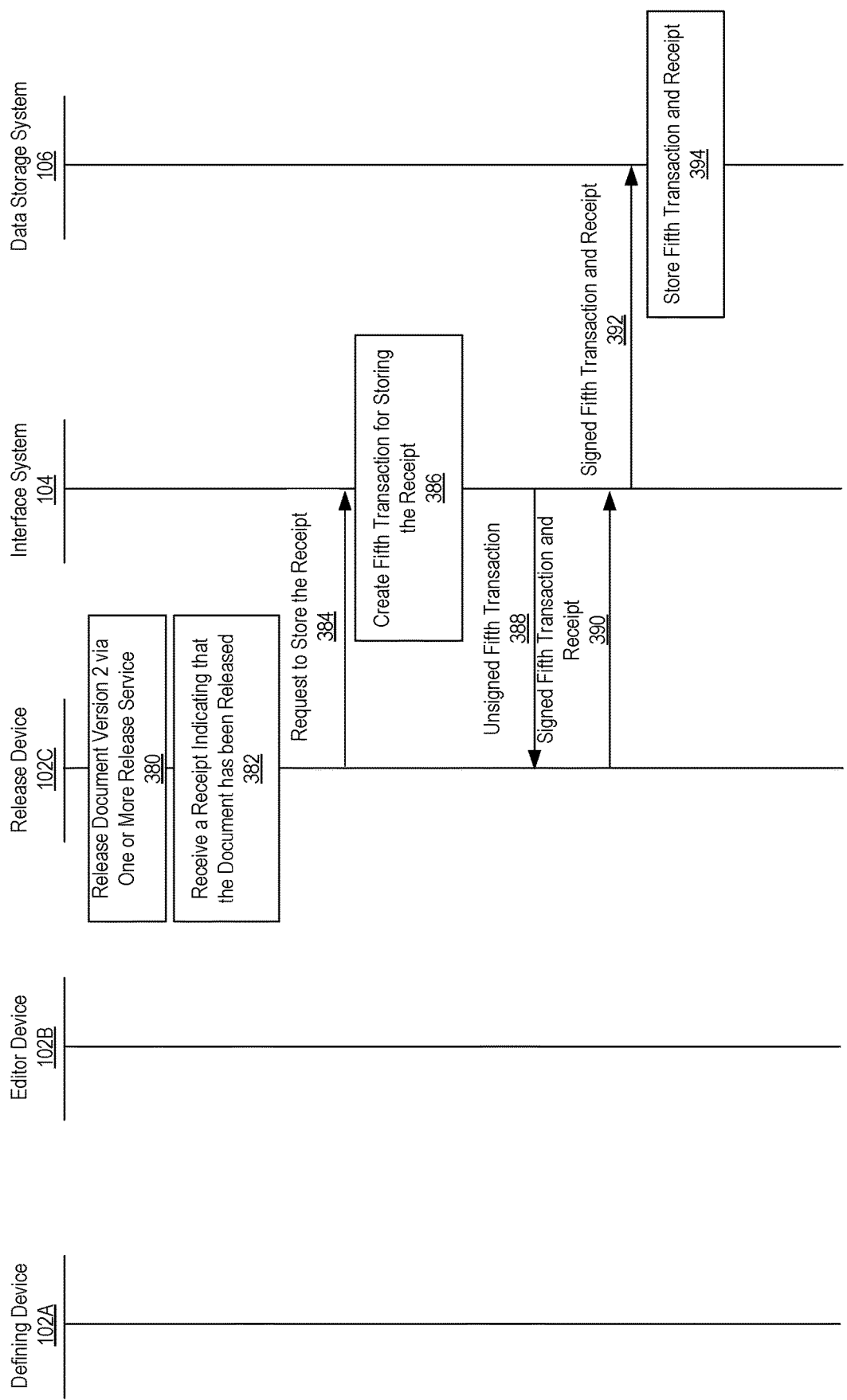

Referring to FIG. 3D, the release device 102C releases 380 the second version of the document to one or more release services that distribute the document to news and media outlets. The release device 102C receives 382 a receipt from the release services indicating that the document has been released. The release device 102C transmits 384 to the interface system 104 a request to store the receipt. The interface system 104 creates 386 a fifth transaction for storing the receipt and provides 388 the fifth transaction unsigned to the release device 102C. The release device 102C returns 390 to the interface system 104 the fifth transaction signed by the release device 102C and the receipt. The release device 102C forwards 392 to the data storage system 106 the signed fifth transaction and the receipt. The data storage system 106 stores 394 the fifth transaction and the receipt in storage database 110 and stores a transaction signature created for the fifth transaction in the signature database 112 as part of workflow's chain of transaction signatures.

In one embodiment, each time the data storage system 106 stores a transaction signature in the signature database 112 (e.g., steps 324, 340, 358, 374, and 394), the data storage system 106 determines whether to export the transaction signature to the anchor system 108 based on stored settings. If the data storage system 106 determines to export the transaction signature, the data storage system 106 transmits the transaction signature to the anchor system 108 as an export anchor. The anchor system 108 stores the export anchor received and creates an import anchor using the export anchor. The anchor system 108 transmits the import anchor to the data storage system 106. The data storage system 106 stores the import anchor in the signature database 112 in association with the export anchor. Specifically, the data storage system adds the import anchor to workflow's chain of transaction signatures.

Figure 4:
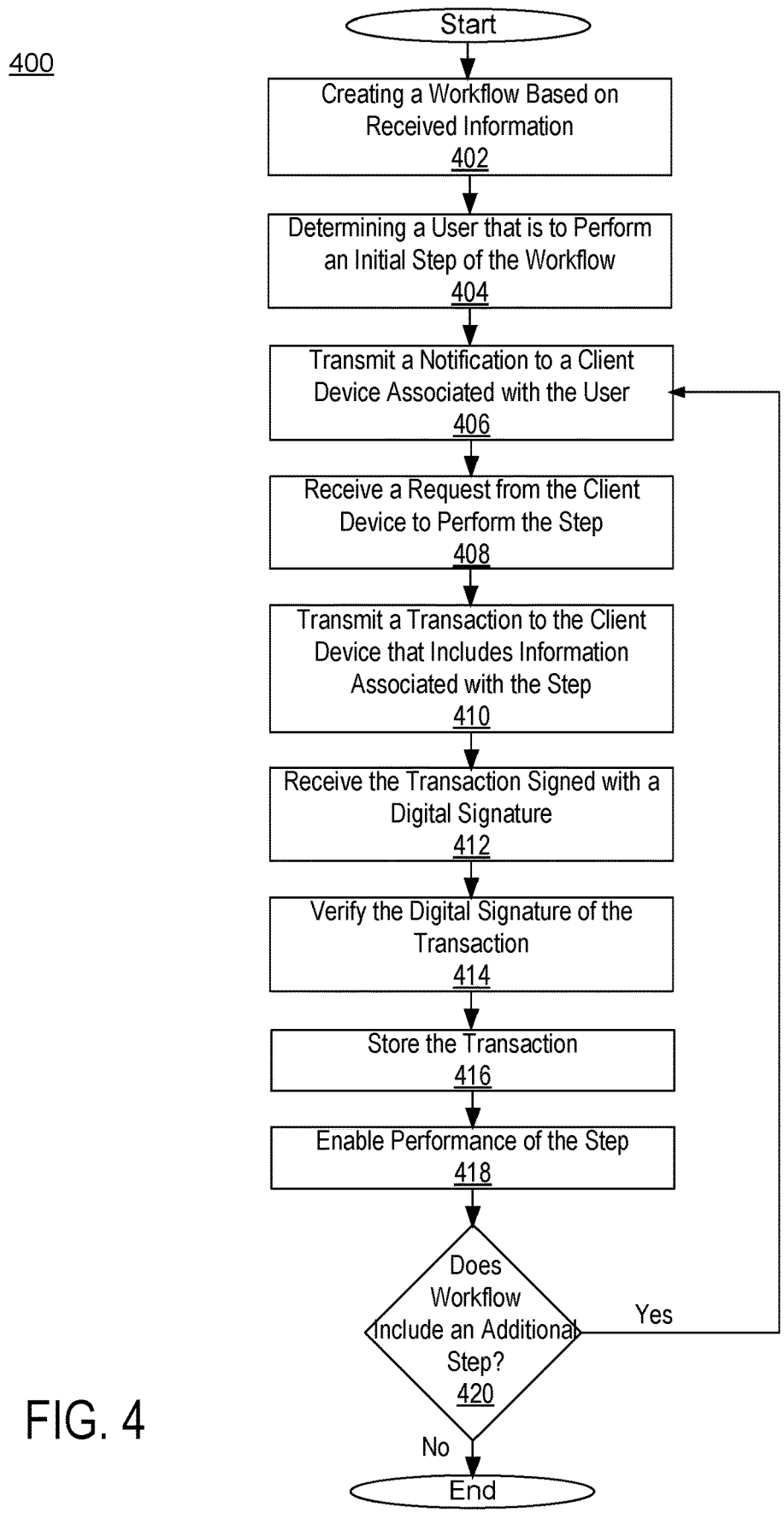
FIG. 4 is a flowchart of a process performed by the interface system for managing a workflow in accordance with one embodiment.

FIG. 4 flow chart of a process 400 performed by the interface system 104 for managing a workflow in accordance with one embodiment. Those of skill in the art will recognize that other embodiments can perform the operations described for FIG. 4 in different order. Moreover, other embodiments can include different and/or additional operations than the ones described.

Assume for purposes of this example that the data storage system 106 is part of interface system 104 as illustrated in FIG. 1B. As a result, operations described above as being performed by the data storage system 106 will be described in this example as generally being performed by the interface system 104.

The process 400 starts with the interface system 104 creating 402 a workflow based on information provided by a user to define the workflow. The interface system 104 determines 404 based on the workflow a user that is to perform an initial step of the workflow. The interface system 104 transmits 406 a notification to a client device 102 associated with the user that is to perform the step. The notification indicates that the user is to perform the step. In one embodiment, prior to receiving the notification that user is unable to initiate performance of the step.

The interface system 104 receives 408 a request from the client device 102 to perform the step. The interface system 104 transmits 410 a transaction to the client device 102. The transaction is created by interface system 104 based on the workflow to include information associated with the step (e.g., information describing the step being performed). The interface system 104 also includes in the transaction the public key of the user that is to perform the next step of the workflow. The interface system 104 determines the user that is to perform the next step based on the created workflow.

The interface system 104 receives 412 from the client the transaction signed with a digital signature. The interface system 104 verifies 414 the digital signature and stores 416 the transaction. Storing the transaction includes the interface system 104 creating a transaction signature for the transaction by hashing the transaction. The interface system 104 stores the transaction using the transaction signature as a key. Additionally, the interface system 104 stores the transaction signature as a start of a transaction signature chain for the workflow. Future transaction signatures created as part of subsequent steps of the workflow are added to the chain. After verifying the digital signature, the interface system 104 also enables 418 performance of the step. The step may involve storing data as requested by the user or retrieving data requested by the user.

The interface system 104 determines 420 whether the workflow includes at least one additional step that needs to be performed. In one embodiment, if the transaction included a public key of a user that is to perform the next step, it indicates to the interface system 104 that at least one additional step is to be performed. The process 400 ends if the interface system 104 determines that no additional steps are to be performed as part of the workflow. However, if the interface system 104 determines that an additional step is to be performed, the interface system 104 performs operations 406-420 for the next step of the workflow that is to be performed by the user whose public key was included in the transaction.

Figure 5:
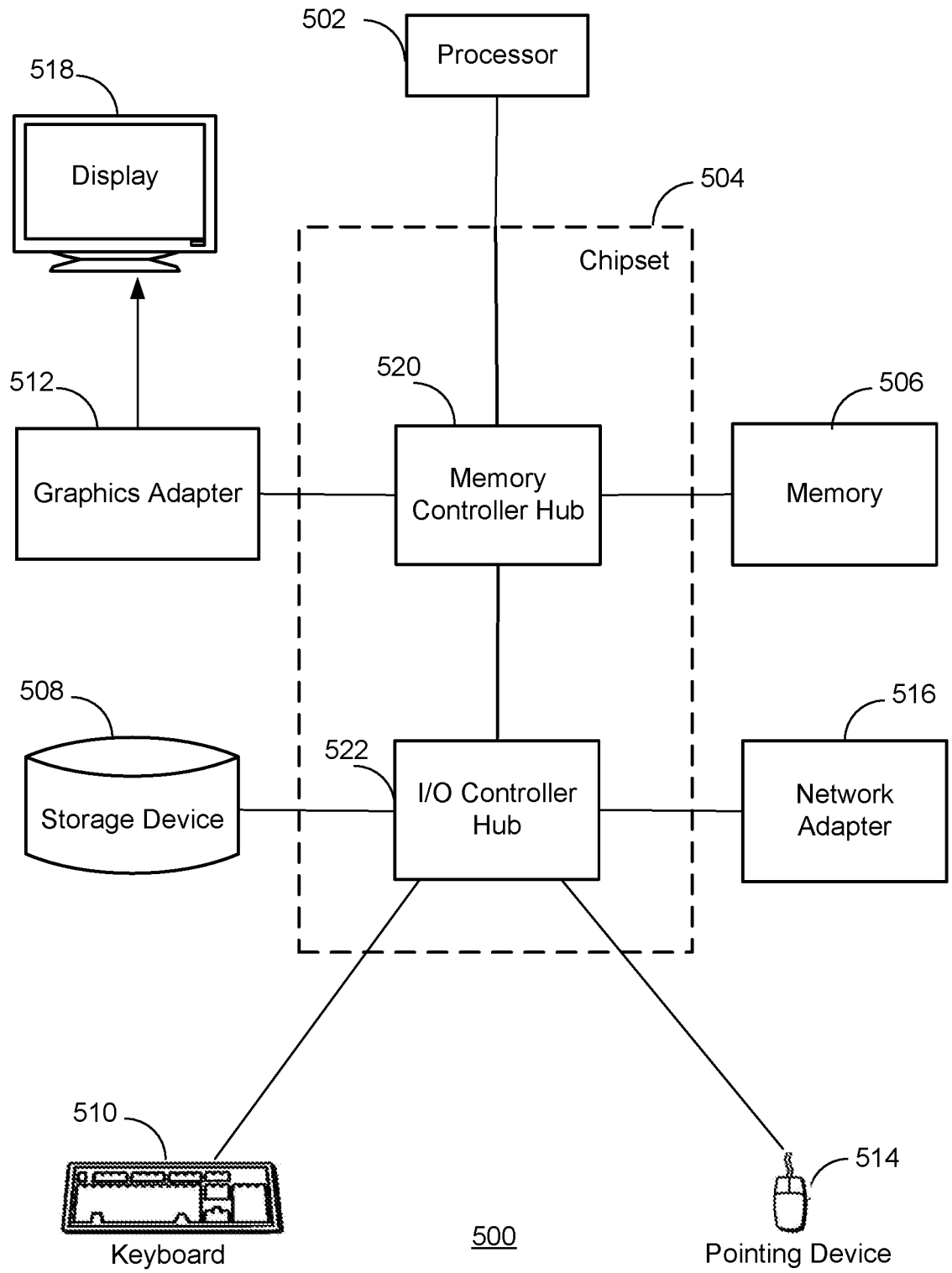
FIG. 5 is a block diagram illustrating a functional view of a typical computer system in accordance with one embodiment.

FIG. 5 is a block diagram illustrating a functional view of a typical computer system 500 for use as one of the systems illustrated in the environment 100 of FIGS. 1A and 1B in accordance with one embodiment. Illustrated are at least one processor 502 coupled to a chipset 504. Also coupled to the chipset 504 are a memory 506, a storage device 508, a keyboard 510, a graphics adapter 512, a pointing device 514, and a network adapter 516. A display 518 is coupled to the graphics adapter 512. In one embodiment, the functionality of the chipset 504 is provided by a memory controller hub 520 and an I/O controller hub 522. In another embodiment, the memory 506 is coupled directly to the processor 502 instead of the chipset 504.

The storage device 508 is a non-transitory computer-readable storage medium, such as a hard drive, compact disk read-only memory (CD-ROM), DVD, or a solid-state memory device. The memory 506 holds instructions and data used by the processor 502. The pointing device 514 may be a mouse, track ball, or other type of pointing device, and is used in combination with the keyboard 510 to input data into the computer system 500. The graphics adapter 512 displays images and other information on the display 518. The network adapter 516 couples the computer system 500 to the network 109. Some embodiments of the computer system 500 have different and/or other components than those shown in FIG. 4.

The computer 500 is adapted to execute computer program modules for providing the functionality described herein. As used herein, the term "module" to refers to computer program instruction and other logic for providing a specified functionality. A module can be implemented in hardware, firmware, and/or software. A module is typically stored on the storage device 508, loaded into the memory 506, and executed by the processor 502.

A module can include one or more processes, and/or be provided by only part of a process. Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

The types of computer systems 500 used by the systems of FIGS. 1A and 1B can vary depending upon the embodiment and the processing power used by the entity. For example, a client device 102 such as a mobile phone typically has limited processing power and a small display 518. The interface system 104, in contrast, may comprise multiple blade servers working together to provide the functionality described herein.

The foregoing described embodiments have been presented for the purpose of illustration; they are not intended to be exhaustive or to limiting to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, described modules may be embodied in software, firmware, hardware, or any combinations thereof.

Reference in the specification to "one embodiment" or to "an embodiment" means that a particular feature, structure, or characteristic is included in at least one embodiment of the disclosure. The appearances of the phrase "in one embodiment" or "a preferred embodiment" in various places in the specification are not necessarily referring to the same embodiment.

Some portions of the above are presented in terms of methods and symbolic representations of operations on data bits within a computer memory. These descriptions and representations are the means used by those skilled in the art to most effectively convey the substance of their work to others skilled in the art. A method is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects disclosed herein include process steps and instructions described herein in the form of a method. It should be noted that the process steps and instructions described herein can be embodied in software, firmware or hardware, and when embodied in software, can be downloaded to reside on and be operated from different platforms used by a variety of operating systems.

The embodiments discussed above also relates to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The methods and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the embodiments are not described with reference to any particular programming language. It will be appreciated that a variety of programming languages may be used to implement the teachings described herein, and any references below to specific languages are provided for disclosure of enablement and best mode.

While the disclosure has been particularly shown and described with reference to a preferred embodiment and several alternate embodiments, it will be understood by persons skilled in the relevant art that various changes in form and details can be made therein without departing from the spirit and scope of the invention.

Finally, it should be noted that the language used in the specification has been principally selected for readability and instructional purposes, and may not have been selected to delineate or circumscribe the inventive subject matter. Accordingly, the disclosure is intended to be illustrative, but not limiting, of the scope of the invention.

What is claimed is:

1. A computer implemented method comprising:
   transmitting, by a computer system to a client device associated with a first user, a notification indicating that the first user is to perform a first step of a workflow comprising a series of steps;
   receiving, by the computer system from the client device, a request to perform the first step based on the notification;
   creating, by the computer system, a transaction for the first step, the transaction comprising a description of the first step and a cryptographic key of the first user;
   transmitting, by the computer system, the transaction to the client device;
   receiving, by the computer system from the client device, a signed transaction comprising the transaction and a digital signature of the first user;
   determining, by the computer system, whether the digital signature is valid based on the cryptographic key;
   responsive to determining that the digital signature is valid:
      creating a transaction signature for the first step based on the signed, transaction and a previous transaction signature included in a chain of transaction signatures comprising one or more transaction signatures associated with a previous step of the workflow, wherein the transaction signature comprises a hash of a hash value generated from hashing the signed transaction and a hash of the previous transaction signature;
      storing, in a node of a data storage system, the transaction signature for the first step in the chain of transaction signatures;
      archiving, in an anchor database distinct from the data storage system, an export anchor comprising the transaction signature for the first step and an identifier of the node, the anchor database not including the one or more transaction signatures associated with the previous step of the workflow;
      receiving, by the computer system, an import anchor transmitted from the anchor database, the import anchor created by hashing the export anchor with additional information on the transaction signature, wherein the import anchor is stored in the anchor system in addition to being transmitted to the computer system;
      including, by the computer system, the import anchor in the node of the data storage system; and
      enabling, by the computer system, the performance of the first step; and
   auditing the data storage system to determine whether the transaction signature in the data storage system was modified without authorization, comprising:
      retrieving the import anchor included in the node of the data storage system,
      retrieving, from the anchor database, the import anchor stored in the anchor database;
      comparing the import anchor included in the node and the import anchor from the anchor system to determine whether the transaction signature in the data storage system was modified without authorization responsive to the comparison.

2. The method of claim 1, further comprising:
   determining, based on the workflow, a second user that is to perform a second step of the workflow; and
   wherein the transaction further comprises an indication that the second user is to perform the second step.

3. The method of claim 1, further comprising:
   responsive to the performance of the first step, transmitting an additional notification to an additional client device associated with a second user, the additional notification indicating that the second user is to perform a second step of the workflow.

4. The method of claim 3, wherein the additional notification is created based on the transaction indicating that the second user is to perform the second step.

5. The method of claim 1, wherein the first user is unable to initiate the first step prior to receiving the notification.

6. The method of claim 1, further comprising:
   responsive to receiving the transaction with the digital signature, determining whether a condition associated with the first step has been satisfied; and
   responsive to determining that the condition has been satisfied and that the signature is valid, enabling the performance of the first step.

7. The method of claim 1, wherein the chain of transaction signatures is a directed acyclic graph (DAG) and the previous transaction signature is included in a root node of the DAG, wherein the previous transaction signature was created for a second step that is prior to the first step in the workflow.

8. The method of claim 1, further comprising:
   storing the transaction in a key-value database using the transaction signature as a key.

9. The method of claim 1, further comprising:
   responsive to determining that the signature is not valid, denying the request to perform the first step.

10. The method of claim 1, wherein the first step involves the first user storing or retrieving data and wherein the transaction comprises metadata of the stored or retrieved data.

11. The method of claim 1, wherein the additional information hashed with the export anchor to create the import anchor is information unique to present time when the import anchor was created.

12. The method of claim 1, wherein the additional information hashed with the export anchor to create the import anchor is at least one of a time stamp signed by a time stamping authority, a block number of a block in which the export anchor is stored in the blockchain, or information from a current publication.

13. A non-transitory computer readable storage medium storing instructions that when executed by one or more processors cause the one or more processors to perform operations comprising :
    transmitting, to a client device associated with a first user, a notification indicating that the first user is to perform a first step of a workflow comprising a series of steps;
    receiving, from the client device, a request to perform the first step based on the notification;
    creating a transaction for the first step, the transaction comprising a description of the first step and a cryptographic key of the first user; transmitting the transaction to the client device;
    receiving, from the client device, a signed transaction comprising the transaction and a digital signature of the first user;
    determining whether the digital signature is valid based on the cryptographic key; and
    responsive to determining that the digital signature is valid:
        creating a transaction signature for the first step based on the signed transaction and a previous transaction signature included in a chain of transaction signatures comprising one or more transaction signatures associated with a previous step of the workflow, wherein the transaction signature comprises a hash of a hash value generated from hashing the signed transaction and the previous transaction signature;
        storing, in a node of a data storage system, the transaction signature for the first step in the chain of transaction signatures;
        archiving, in an anchor database distinct from the data storage system, an export anchor comprising the transaction signature for the first step and an identifier of the node, the anchor database not including the one or more transaction signatures associated with the previous step of the workflow;
        receiving, by the computer system, an import anchor transmitted from the anchor database, the import anchor created by hashing the export anchor with additional information on the transaction signature, wherein the import anchor is stored in the anchor system in addition to being transmitted to the computer system;
        including, by the computer system, the import anchor in the node of the data storage system; and
        enabling the performance of the first step; and
    auditing the data storage system to determine whether the transaction signature in the data storage system was modified without authorization, the instructions further comprising:
        retrieving the import anchor included in the node of the data storage system,
        retrieving, from the anchor database, the import anchor stored in the anchor database;
        comparing the import anchor included in the node and the import anchor from the anchor system to determine whether the transaction signature in the data storage system was modified without authorization responsive to the comparison.

14. The computer readable storage medium of claim 13, wherein the instructions further cause the one or more processors to perform operations comprising:
    determining, based on the workflow, a second user that is to perform a second step of the workflow; and
    wherein the transaction further comprises an indication that the second user is to perform the second step.

15. The computer readable storage medium of claim 13, wherein the instructions further cause the one or more processors to perform operations comprising:
    responsive to the performance of the first step, transmitting an additional notification to an additional client device associated with a second user, the additional notification indicating that the second user is to perform a second step of the workflow.

16. The computer readable storage medium of claim 15, wherein the additional notification is created based on the transaction indicating that the second user is to perform the second step.

17. The computer readable storage medium of claim 13, wherein the first user is unable to initiate the first step prior to receiving the notification.

18. The computer readable storage medium of claim 13, wherein the instructions further cause the one or more processors to perform operations comprising:
    responsive to receiving the transaction with the digital signature, determining whether a condition associated with the first step has been satisfied; and
    responsive to determining that the condition has been satisfied and that the signature is valid, enabling the performance of the first step.

19. The computer readable storage medium of claim 13, wherein the chain of transaction signatures is a directed acyclic graph (DAG) and the previous transaction signature is included in a root node of the DAG, wherein the previous transaction signature was created for a second step that is prior to the first step in the workflow.

20. The computer readable storage medium of claim 13, wherein the instructions further cause the one or more processors to perform operations comprising:
    storing the transaction in a key-value database using the created transaction signature as a key.

21. The computer readable storage medium of claim 13, wherein the additional information hashed with the export anchor to create the import anchor is information unique to present time when the import anchor was created.

22. The computer readable storage medium of claim 13, wherein the additional information hashed with the export anchor to create the import anchor is at least one of a time stamp signed by a time stamping authority, a black number of a block in which the export anchor is stored in the blockchain, or information from a current publication.

* * * * *